United States Patent
Zanghi et al.

(10) Patent No.: US 10,289,984 B1
(45) Date of Patent: May 14, 2019

(54) AUTOMATED VEHICLE DIAGNOSTICS AND MAINTENANCE

(71) Applicant: Zoox, Inc., Menlo Park, CA (US)

(72) Inventors: Greg Zanghi, Santa Clara, CA (US); Joseph Funke, Redwood City, CA (US); Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 85 days.

(21) Appl. No.: 15/673,829

(22) Filed: Aug. 10, 2017

(51) Int. Cl.
| | |
|---|---|
| *G05D 1/00* | (2006.01) |
| *G05D 1/02* | (2006.01) |
| *G06N 3/08* | (2006.01) |
| *G07C 5/00* | (2006.01) |
| *G07C 5/08* | (2006.01) |
| *G01C 21/34* | (2006.01) |
| *G06N 20/00* | (2019.01) |
| *G06Q 10/00* | (2012.01) |

(Continued)

(52) U.S. Cl.
CPC .......... *G06Q 10/20* (2013.01); *G01C 21/343* (2013.01); *G01C 21/3484* (2013.01); *G05D 1/0221* (2013.01); *G05D 1/0225* (2013.01); *G06N 20/00* (2019.01); *G06Q 10/06398* (2013.01); *G06Q 10/063112* (2013.01); *G06Q 10/1097* (2013.01); *G07C 5/008* (2013.01); *G07C 5/0808* (2013.01); *G05D 1/0088* (2013.01); *G06N 3/088* (2013.01)

(58) Field of Classification Search
CPC ............... G06Q 10/20; G06Q 10/1097; G06Q 10/06398; G06Q 10/063112; G05D 1/0221; G05D 1/0225; G05D 1/0088; G06N 99/005; G06N 3/088; G07C 5/0808; G07C 5/008; G01C 21/3484; G01C 21/343

See application file for complete search history.

(56) References Cited

U.S. PATENT DOCUMENTS 5,467,268 A * 11/1995 Sisley et al. ....... G06Q 10/1097
 705/7.16
6,064,973 A * 5/2000 Smith et al. ........... G06Q 10/00
 705/7.26

(Continued)

OTHER PUBLICATIONS

Office Action for U.S. Appl. No. 15/673,820, dated Sep. 28, 2018, Edren et al., "Vehicle Self-Diagnostics", 16 pages.

*Primary Examiner* — Dale W Hilgendorf
(74) *Attorney, Agent, or Firm* — Lee & Hayes, P.C.

(57) ABSTRACT

Systems, methods, and apparatuses described herein are directed to automated vehicle diagnostics and maintenance. For example, vehicles can include sensors monitoring vehicle components, for perceiving objects and obstacles in an environment, and for navigating the vehicle to a destination. Data from these and other sensors can be leveraged to track a performance of the vehicle over time to determine a state of vehicle components, and/or changes to acceleration/deceleration and steering behavior of the vehicle over time. As issues for servicing are determined, the methods, apparatuses, and systems can include automated scheduling of vehicle maintenance. For example, based on a determination of the potential issues based on sensor data and/or user indications, vehicle maintenance can be scheduled to be performed in the field or at a service center. Technicians can be assigned to perform vehicle maintenance based on the servicing issue and/or on capabilities of the technician.

20 Claims, 7 Drawing Sheets

(51) Int. Cl.
*G06Q 10/06* (2012.01)
*G06Q 10/10* (2012.01)

(56) References Cited

U.S. PATENT DOCUMENTS

| | | | |
|---|---|---|---|
| 6,115,693 A * | 9/2000 | McDonough et al. | ................... G06Q 10/06311 705/7.16 |
| 6,134,530 A * | 10/2000 | Bunting et al. | .... G06Q 10/6311 705/7.25 |
| 6,587,851 B1 | 7/2003 | Ditcharo et al. | |
| 6,609,050 B2 | 8/2003 | Li | |
| 8,321,253 B2 * | 11/2012 | Mitchell et al. | ............................ G06Q 10/06311 705/7.16 |
| 8,874,305 B2 | 10/2014 | Dolgov et al. | |
| 8,996,235 B2 | 3/2015 | Singh et al. | |
| 9,205,828 B1 | 12/2015 | Lombrozo et al. | |
| 9,244,462 B2 | 1/2016 | Pedersen | |
| 9,623,905 B2 | 4/2017 | Shashua et al. | |
| 9,633,564 B2 | 4/2017 | Ferguson | |
| 2009/0062978 A1 * | 3/2009 | Picard | ................... G07O 5/008 701/31.4 |
| 2009/0240472 A1 | 9/2009 | Winnebeck et al. | |
| 2015/0348335 A1 | 12/2015 | Ramanujam | |
| 2016/0343010 A1 * | 11/2016 | East, III et al. | ....... G06Q 10/20 |
| 2017/0278312 A1 * | 9/2017 | Minster et al. | ........ G07C 5/008 |
| 2017/0297584 A1 | 10/2017 | Chen et al. | |
| 2018/0025558 A1 | 1/2018 | Chen et al. | |
| 2018/0039580 A1 | 2/2018 | Schneider | |
| 2018/0225769 A1 | 8/2018 | Slusar et al. | |

* cited by examiner

AUTOMATED VEHICLE DIAGNOSTICS AND MAINTENANCE

BACKGROUND

Vehicle maintenance is often performed on regularly scheduled intervals or in response to a failure of a component of the vehicle. However, vehicle maintenance schedules are often imprecise and can result in maintenance being performed too soon or too late with respect to a status of the vehicle. Further, scheduling of vehicle maintenance can be an administrative burden to coordinate between vehicles in need of maintenance and repair facilities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
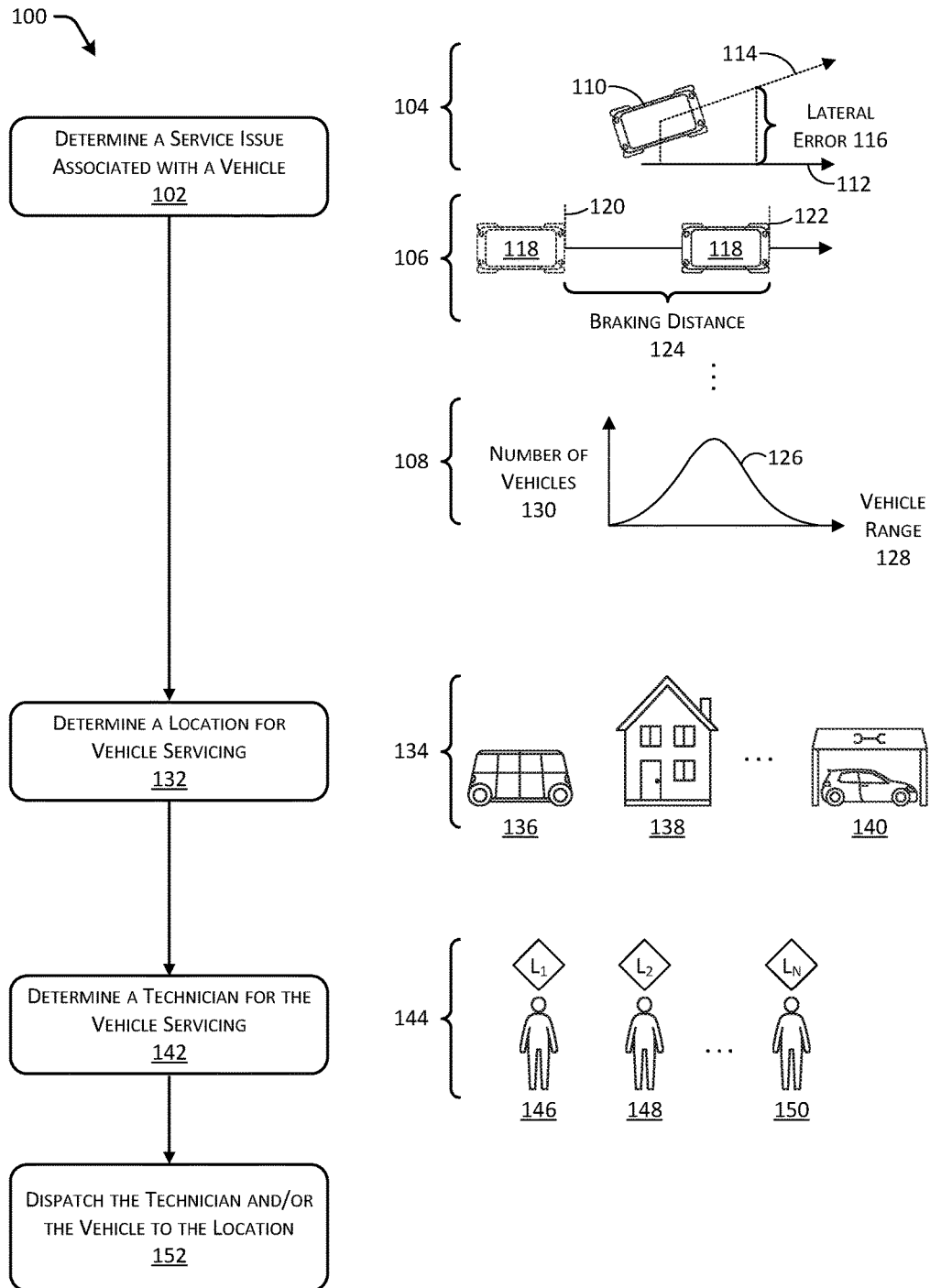
FIG. 1 illustrates a pictorial flow diagram of an example process for automated vehicle diagnostics and maintenance.

This disclosure describes methods, apparatuses, and systems for automated vehicle diagnostics and maintenance. For example, vehicles can include sensors monitoring vehicle components, for perceiving objects and obstacles in an environment, and for navigating the vehicle to a destination. Data from these and other sensors can be leveraged to track a performance of the vehicle over time to determine a state of vehicle components, and/or changes to acceleration/deceleration and/or steering behavior of the vehicle over time. Further, data can be received from a user associated with the vehicle regarding a state of the vehicle and relating to, for example, cleanliness or a ride performance of the vehicle. Data associated with a fleet of vehicles can be aggregated to determine if vehicle performance is within nominal values. Further, individual vehicle performance traversing road segments can be compared to aggregated vehicle performance over road segments to determine outlying behavior as well. These and other data can be captured and analyzed to determine potential issues for servicing.

As issues for servicing are determined, the methods, apparatuses, and systems can include automated scheduling of vehicle maintenance. For example, based on a determination of potential issues based on sensor data (e.g., raw sensor data, processed sensor data, error codes, etc.) and/or user indications, vehicle maintenance can be scheduled to be performed in the field (e.g., at a mobile location or at a location with limited facilities) or at a service center (e.g., at a fixed location capable of addressing substantially all vehicle issues). For example, some servicing issues (e.g., tire changes, cleaning, etc.) can be performed in a distributed fashion by a mobile technician, while some servicing issues (e.g., wheel alignment, system overhauls, etc.) can be performed at a fixed, specialized service center.

Further, technicians can be assigned to perform vehicle maintenance based on the servicing issue and/or on capabilities of the technician. For example, technicians can be associated with a particular skill level, or can be qualified to perform types of vehicle maintenance or repairs. The skill level can be based in part on previous work experience, certifications, audits of the maintenance or repairs, etc. Further, servicing tasks can be assigned to technicians based on a variety of other factors, including, but not limited to: location (e.g., of the technician and/or vehicle to be serviced, etc.); traffic (e.g., at or between a first location associated with the technician and a second location associated with the vehicle, etc.); time of day; weather; inventory (e.g., of parts, tools, etc.); technician demand (e.g., other servicing jobs to be performed, time since last job, etc.); vehicle demand (e.g., requests for the vehicle or fleet of vehicles to perform transportation services, etc.); vehicle maintenance history; technician efficiency (e.g., time to complete a servicing task, technician billing rate, etc.); etc.

In some cases, for servicing to be performed in the field, a vehicle to be serviced can be instructed to remain at a location or proceed to a location associated with the technician assigned to service the vehicle. For example, the technician can operate in conjunction with a mobile service facility (e.g., a car or van), or can operate out of a home garage associated with the technician. In some instances, the vehicle to be serviced can be instructed to navigate to the location associated with the technician. In some instances, the vehicle to be serviced can be instructed to remain at a location so that the technician can travel to the location. In some instances, the vehicle to be serviced and the technician can meet at a location convenient to the vehicle and/or the technician.

As technicians perform and complete servicing tasks, a performance of the technicians can be evaluated to determine a quality of the servicing performed by the technician. Over time, if a quality of performance is above a threshold value and/or if a number of servicing tasks is above a threshold number, a skill level of the technician can be updated (e.g., increased) and new, more complex servicing tasks can be assigned to the technician. Thus, as technicians become more proficient over time they can be rewarded with additional tasks, higher pay, better schedules, etc.

In some cases, for servicing to be performed at a service center, a service center can be selected based on capabilities to perform repairs, skill level, parts inventory, etc. For example, for a service center including multiple lanes or bays to service multiple vehicles simultaneously, operations described herein can include instructing the vehicle to navigate to a particular lane or bay at the service center, where a qualified technician and any replacement parts or materials for the servicing issue can be ready.

As materials are consumed by vehicle maintenance in an environment (e.g., in a city), the operations discussed herein can include determining whether inventory is to be replaced and/or if parts are to be retrieved and returned to a central location for additional processing (e.g., for repair or diagnosis). In some instances, inventory can be managed (e.g., collected and/or replaced) in an automated fashion by dispatching vehicles to servicing locations based on the servicing issues performed.

Vehicles to be serviced can include autonomous vehicles in a fleet of autonomous vehicles providing transportation services to users. In one implementation, servicing issues can be identified and individual users (e.g., technicians) can perform servicing and can receive priority for subsequent transportation services, for example. In one use case, an autonomous vehicle can provide an indication that a battery powering the autonomous vehicle is low and in need of charging. A user can offer to charge the autonomous vehicle overnight at a house associated with the user, for example, and based on receiving an indication that the charging is complete, the user can receive priority status when requesting transportation services. For example, when the user requests an autonomous vehicle to drive to a particular location during a period of heavy demand, the user providing the charging services can receive priority access to the autonomous vehicle.

The methods, apparatuses, and systems described herein can be implemented in a number of ways. Example implementations are provided below with reference to the following figures. Although discussed in the context of autonomous vehicles, the methods, apparatuses, and systems described herein can be applied to a variety of vehicles, and are not limited to autonomous vehicles. Further, although the operations can be described with respect to one particular type of sensor, the operations discussed herein can be applied to any sensor type or data type.

FIG. 1 illustrates a pictorial flow diagram of an example process 100 for automated vehicle diagnostics and maintenance.

At operation 102, the process can include determining a service issue associated with a vehicle. For example, the process 102 can include receiving sensor data and determining, based at least in part on the sensor data, that servicing can be performed on the vehicle. Also, the process 102 can include receiving an indication from a user of a suspected servicing issue or an indication that servicing should be performed. Examples 104, 106, and 108 illustrate various types of data and/or information that can be collected, analyzed, and/or evaluated to determine the service issue associated with the vehicle, as discussed herein. The example 104 illustrates an issue with a lateral performance of the vehicle; the example 106 illustrates an issue with a longitudinal performance of the vehicle; and the example 108 illustrates an issue with respect to a performance of a fleet of vehicles. As can be understood, any data can be captured and/or analyzed to determine potential service issues associated with a vehicle. In general, a service issue may include potential hardware malfunctions associated with the autonomous vehicle, issues associated with cleanliness or ride performance, or a behavior of the autonomous vehicle that deviates from (or suggests a future deviation from) a nominal or expected performance of the autonomous vehicle.

The example 104 illustrates an issue with the lateral performance of a vehicle. For example, a vehicle 110 can be an autonomous vehicle that receives instructions from a planner system of the vehicle 110 to traverse an intended path 112 to navigate to a destination. Over time, the vehicle 110 can traverse an actual path 114 that illustrates an actual operation of the vehicle 110. Further, in some cases, there can be a lateral error 116 between the intended path 112 and the actual path 114 traversed by the vehicle 110. The operation 102 can include monitoring the lateral error 116, for example, to determine if the lateral error 116 is above a threshold over a period of time. In some instances, the operation 102 can include integrating the lateral error 116 over a period of time such as an hour, day, week, etc., to determine the error over time. By way of example, if the lateral error 116 consistently reflects that the actual path 114 of the vehicle is to the right of the intended path 112, the service issue can be determined to be a misalignment of the wheels, or a flat tire, etc.

The example 106 illustrates an issue with the longitudinal performance of a vehicle 118 over time. For example, the vehicle 118 can apply vehicle brakes at a first point 120 and can stop at a second point 122. Thus, a braking distance 124 can be associated with the vehicle 118, and can be associated with conditions of the vehicle 118 during application of the vehicle brakes. For example, the braking distance 124 can be associated with vehicle conditions including but not limited to: intended braking force; intended braking distance; road conditions (e.g., wet, dry, pavement, gravel, dirt, etc.); weather conditions (e.g., temperature, pressure, humidity, time of day, etc.); road segments (e.g., locations on a map); distance traveled (e.g., from a previous brake maintenance/adjustment, etc.); vehicle weight; vehicle occupancy; vehicle speed; etc. The operation 102 can include capturing braking data over time (e.g., hours, days, weeks, months, etc.) and analyzing the data to determine changes in braking performance. If a braking performance is below a threshold value (or if a braking distance is above a threshold distance for a particular set of vehicle conditions), the operation 102 can determine that a potential service issue can be addressed for the vehicle.

Similarly, and not illustrated in the example 106, longitudinal issues associated with the vehicle 118 can include acceleration as well. For example, the vehicle 118 can be commanded to accelerate at a particular rate, while an actual acceleration can vary from the intended rate. The acceleration of the vehicle 118 can be monitored over time to determine if there are issues with acceleration (e.g., such as increased drag due to other vehicle components).

The example 108 illustrates an issue with respect to a performance of a fleet of vehicles. For example, in a fleet involving at least two vehicles, performance of individual vehicles can be monitored and aggregated to determine nominal values. In the example 108, aggregated data is illustrated as a distribution 126 representing a vehicle range 128 associated with a number of vehicles 130. For example, the vehicle range 128 can represent a distance that a particular vehicle travels for particular amount of energy input (e.g., battery, gas, diesel, etc.), and the number of vehicles 130 can represent the number of vehicles that with the corresponding range. If a particular vehicle is beyond a threshold (e.g., outside a standard deviation associated with the distribution 126), the operation 102 can determine that a potential servicing issue can be present (e.g., such as a battery nearing the end of its lifecycle, faulty GPS sensor, etc.).

Though not illustrated in FIG. 1, a further example of data used in process 102 may be individual components which are able to provide error reporting (e.g., as an error code). In such examples, data may include any component having a microcontroller attached to provide some form of error reporting, such as, but not limited to, smart tires reporting on tire pressure, controllers which report insufficient pressure in engine combustion chambers, controllers which report air flow (such as a Mass Air Flow sensor), and the like.

As can be understood in the context of this disclosure, the operation 102 can include receiving any type of data associated with a vehicle (such as an autonomous vehicle). For example, data can include, but is not limited to: LIDAR data; SONAR data; RADAR data; camera data (e.g., of the interior and/or exterior of the vehicle); GPS data; wheel encoder data; inertial measurement unit (IMU) data; engine performance data (e.g., temperature, pressure, RPM, etc.); fuel/energy level; cabin temperature; HVAC status; braking inputs; steering inputs; tire pressure; vehicle weight; route information (e.g., intended/actual path traveled by the vehicle); environmental factors (e.g., external temperature, pressure, humidity, wind, sun, time of day, season, traffic, etc.); vehicle maintenance history; vehicle navigation history (e.g., average velocity, traffic, etc.); error code(s) associated with individual components; etc. The operation 102 can include receiving data from any number of vehicles to generate aggregated data to evaluate nominal performance of a vehicle (e.g., an average or baseline performance of a vehicle statistically represented by data associated with a plurality of vehicles).

Further, the operation 102 can include receiving one or more indications from a user that is driving a vehicle, is a passenger in the vehicle, or is otherwise associated with the vehicle. For example, the indication can be received via a computing device associated with the vehicle (e.g., installed in the vehicle providing an interface for the user), or from a computing device associated with the user (e.g., a smartphone of the user). For example, the one or more indications can be associated with a state of the vehicle such as cleanliness, smell, ride performance (e.g., comfort), observations about the vehicle operation (e.g., reporting noises, etc.), etc.

At operation 132, the process can include determining a location for vehicle servicing. For example, the location for vehicle servicing can be based in part on the service issue determined to be associated with the vehicle in the operation 102. In some instances, a service issue can be serviced at a mobile location (e.g., by a mobile technician), at a location associated with a technician (e.g., at a home garage associated with the technician), or at a fixed service center. In some instances, a plurality of service issues can be possible based on feedback from one or more sensors of the vehicle, in which case, the most likely service issue can determine the location for the vehicle servicing. In some instances, the location can be based at least in part on availability of mobile technicians or service centers, and/or availability of inventory at respective locations.

An example 134 illustrates various locations for vehicle servicing, as discussed herein. A mobile service vehicle 136 can be associated with a technician that can travel to a vehicle in need of servicing or repair, or to a location associated with the vehicle in need of servicing or repair. A home garage 138 can be associated with a technician as well. However, the home garage can have limited resources and/or can be limited to a type or complexity of service issues addressable at the location. A service center 140 can be an established repair shop capable of addressing nearly all service issues associated with a vehicle. For example, the service center 140 can have specialized equipment for performing maintenance or service, as discussed herein. In some instances, the service center 140 can specialize in addressing various service issues.

At operation 142, the process can include determining one or more technicians for the vehicle servicing. In an example 144, technicians 146, 148, and 150 can be associated a ranking or skill level. As illustrated, the technician 146 is associated with $L_1$, a first skill level; the technician 148 is associated with $L_2$, a second skill level; and the technician 150 is associated with $L_N$, an n-th skill level. In some instances, the various skill levels can correspond to a type of vehicle servicing to be performed. For example, a first skill level $L_1$ can correspond to cleaning of the vehicle, while a second skill level $L_2$ can correspond to tire maintenance, and an n-th skill level $L_N$ can correspond to engine repairs. In some instances, the skill level can be based in part on previous work experience, certifications, audits of the maintenance or repairs, etc. Of course, skill levels as discussed herein can be used to distinguish between any general category or type of service issues, general experience, preferred provider status, etc.

As mentioned above, a technician can be determined based a number of factors, including, but not limited to: location (e.g., of the technician and/or vehicle to be serviced, etc.); traffic (e.g., to deploy the technician and/or vehicle, etc.); time of day; weather; inventory (e.g., of parts, tools, etc.); technician demand (e.g., other servicing jobs to be performed, time since last job, etc.); vehicle demand (e.g., requests for the vehicle or fleet of vehicles to perform transportation services, etc.); vehicle maintenance history; technician efficiency (e.g., time to complete servicing task, billing rate, etc.); etc. Technicians can be associated with service centers, can be employees associated with a fleet of vehicles, can be independent contractors, etc.

At operation 152, the process can include dispatching the technician and/or the vehicle to the location. In an example where the vehicle to be serviced is an autonomous vehicle, the operation 152 can include determining a route, path, or trajectory for the autonomous vehicle to navigate to a mutual meeting point for the autonomous vehicle and the technician, a location of the technician (e.g., a location associated with a home garage or with a current location of the technician), or a location of a service center. In some instances, the autonomous vehicle may be instructed to remain at a location, while the technician may be dispatched to the autonomous vehicle. In some instances, the operation 152 can include dispatching a vehicle to the technician to transport the technician to a location associated with the vehicle to be serviced. In some instances, the operation 152 can include providing an indication to the technician selected to perform the vehicle servicing of a schedule/timing of the servicing, what part(s) and/or tool(s) can be needed for the vehicle servicing, etc. In some instances, the operation 152 can include providing instructions or directions to the technician of where to go to service the vehicle. In some instances, the operation 152 can include dispatching a vehicle (in addition to dispatching the technician) including part(s), tools, etc., which can be used during the vehicle servicing. In one example where the vehicle is dispatched to a service center to be serviced, the operation 152 can include instructing the vehicle to travel to a particular service bay associated with a technician and/or inventory associated with the vehicle servicing to be performed.

Figure 2:
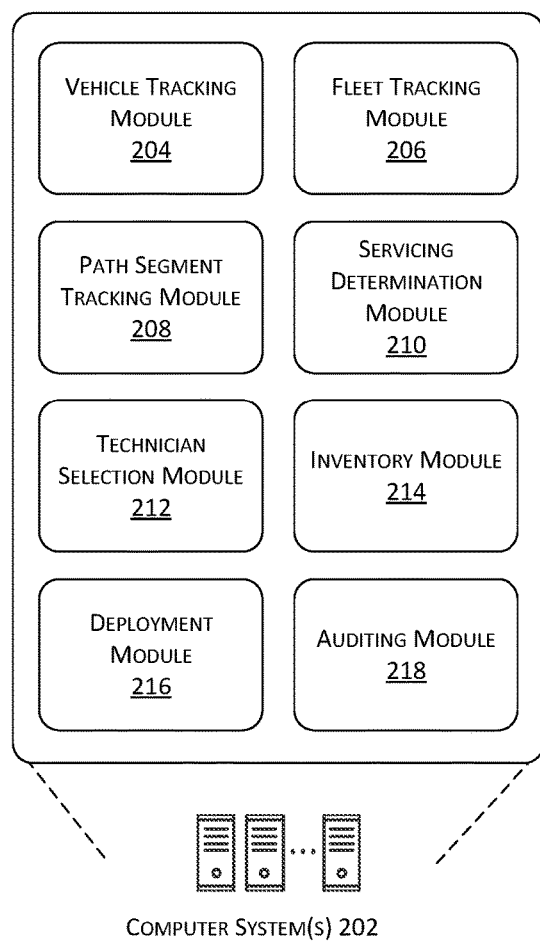
FIG. 2 illustrates an example architecture for automated vehicle diagnostics and scheduling of maintenance.

FIG. 2 illustrates an example architecture 200 for automated vehicle diagnostics and scheduling of maintenance, as described herein. For example, the architecture 200 can include one or more computer system(s) 202 including various hardware and/or software to implement aspects of the systems, methods, and apparatuses described herein. For example, the computer system(s) 202 can include a vehicle tracking module 204, a fleet tracking module 206, a path segment tracking module 208, a servicing determination module 210, a technician selection module 212, an inventory module 214, a deployment module 216, and an auditing module 218.

In some instances, the computer system(s) 202 can be embodied as a central server that receives inputs from one or more autonomous vehicles. In some instances, the computer system(s) 202 can be embodied in an autonomous vehicle. In some instances, the computer system(s) 202 can further provide perception and planning functionality for the autonomous vehicle, and can capture any data as discussed herein.

Turning to the vehicle tracking module 204, the vehicle tracking module 204 can include functionality to receive data associated with a vehicle to track vehicle performance over time. For example, the vehicle tracking module 204 can receive raw sensor data from the vehicle, metadata or determinations based at least in part on sensor data from the vehicle, and/or indications from one or more users. In some instances, the vehicle tracking module 204 can receive state information associated with an individual vehicle to determine conditions associated with the vehicle over time. In one example, the vehicle tracking module 204 can receive an indication from a vision system monitoring an interior of an autonomous vehicle indicating that the interior of the vehicle needs cleaning. In another example, the vehicle tracking module 204 can receive an indication from a user (e.g., via an application on a smartphone) that the autonomous vehicle should be cleaned. In another example, the vehicle tracking module 204 can receive indications of steering commands, acceleration and deceleration commands, intended paths, and actual paths taken by an autonomous vehicle, etc., to evaluate a performance of the autonomous vehicle over time.

The fleet tracking module 206 can include functionality to aggregate vehicle information for a fleet of vehicles. For example, the fleet tracking module 206 can analyze fleet data to determine nominal performance values associated with vehicle operation(s). In some instances, the fleet tracking module 206 can classify various vehicles within a fleet based on vehicle capabilities, models, production years, etc., to aid in comparison between vehicles. By way of example, and without limitation, the fleet tracking module 206 may track energy usage of an HVAC (heating, ventilation, and air conditioning) system for a fleet of vehicles to determine, for a set of similar conditions or environmental factors, nominal performance values of the HVAC system, to determine potential issues with an HVAC system, window and door seals, vehicle insulation, etc.

The path segment tracking module 208 can include functionality to receive path segment information corresponding to segments of road in an environment, for example. As a plurality of vehicles drive over a segment of road (or a single vehicle drives over the segment of road multiple times) the path segment tracking module 208 can associate vehicle performance with the particular segment of road. The tracking module 208 can determine vehicle operation that is nominal for the path segment, or vehicle operation that is outside the nominal range, to determine potential service issues associated with a vehicle.

The servicing determination module 210 can include functionality to receive data from the vehicle tracking module 204, the fleet tracking module 206, and/or the path segment tracking module 208 to determine service issues that can be associated with a particular vehicle. For example, the servicing determination module 210 can include operations to determine lateral and longitudinal error of vehicle positioning over time and determine what systems of the vehicle can be experiencing a service issue. In some instances, the servicing determination module 210 can determine that a plurality of service issues can be associated with the vehicle, with individual confidence levels associated with individual service issues. In some instances, the servicing determination module 210 can determine one or more error codes associated with the service issue to provide to various modules, or technicians, for example.

In some instances, the servicing determination module 210 can include one or more machine learning algorithms and/or heuristic technologies to determine service issues based on the data discussed herein. Further, in some instances, the servicing determination module 210 can access a database where vehicle behavior(s) are mapped to service issues. In some instances, the one or more machine learning algorithms can include a neural network.

As described herein, an exemplary neural network is a biologically inspired algorithm which passes input data through a series of connected layers to produce an output. One example of a neural network can include a convolutional neural network, or CNN. Each layer in a CNN can also comprise another CNN, or can comprise any number of layers. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

The technician selection module 212 can include functionality to select one or more technicians to perform vehicle servicing based a variety of factors, such as the potential service issue(s), skill level of the technician, etc. For example, the technician selection module 212 can utilize one or more optimization algorithms (e.g., combinatorial optimization algorithms) to assign technicians to address service issues associated with a fleet of vehicle to optimize an availability of the vehicles based on the availability of technicians. The technician selection module 212 can select a mobile technician or a technician associated with a service center, for example. Factors on which the selection of a technician can be based include, but are not limited to: technician skill level or qualifications; technician work experience, certifications, audits of the maintenance or repairs, etc.; location (e.g., of the technician and/or vehicle to be serviced, etc.); traffic (e.g., to deploy the technician and/or vehicle, etc.); time of day; weather; inventory (e.g., of parts, tools, etc.); technician demand (e.g., other servicing jobs to be performed, time since last job, etc.); vehicle demand (e.g., requests for the vehicle or fleet of vehicles to perform transportation services, etc.); vehicle maintenance history; technician efficiency (e.g., time to complete servicing task, billing rate, etc.); etc.

The inventory module 214 can include functionality to determine an inventory associated with a technician to deliver or pick up parts and/or tools associated with vehicle servicing. For example, the inventory module 214 can store information associated with parts and tools accessible to or maintained by individual technicians and/or service centers. In an event where a service issue calls for a specialized tool or part, the inventory module 214 can include functionality to determine a location of the nearest tool or part and arrange transportation to provide the item to the technician performing the vehicle servicing. Further, the inventory module 214 can include functionality to track parts (e.g., defective or replaced parts) or tools used in vehicle servicing, and can arrange for the items to be picked up and redistributed to other locations. For example, a defective part can be returned to a service center for in-depth testing and analysis, and if needed, refurbishing. The inventory module 214 can operate in conjunction with the other modules to determine technicians that have inventory to perform a vehicle servicing, for example.

The deployment module 216 can include functionality to deploy one or more of a technician to a location of a vehicle to be serviced, a technician and a vehicle to be serviced to a common location, a vehicle to a location associated with a mobile technician, or a vehicle to a service center. Further, the deployment module 216 can include functionality to deploy a vehicle to pick up or deliver inventory items or tools, as discussed herein. In some cases, some or all of the vehicles can be autonomous vehicles, in which case, the deployment module 216 can include navigation instructions to navigate via a particular route, path, or trajectory. In some instances, the deployment module 216 can provide machine instructions or navigation instructions for a user interface (e.g., in the form of driving instructions for a technician to navigate to a location associated with servicing the vehicle), for example. In some instances, the instructions can be based in part to minimize travel time, vehicle downtime, or can be based in part on reduced functionality of a vehicle to be serviced.

The auditing module 218 can include functionality to audit a performance of vehicle servicing to determine a quality of servicing, maintenance, and/or repair. For example, upon completion of a servicing task by a first technician, the auditing module 218 can instruct a second technician to review the vehicle after servicing to evaluate the performance of the first technician. In some instances, the auditing module 218 can initiate an audit based on a number of factors, including but not limited to: a skill level of a technician; a random selection; a selection rate (e.g., evaluating one of every ten vehicle services); a service history associated with a vehicle; complexity of vehicle servicing, etc. In some instances, the auditing module 218 can analyze sensor data indicating a performance of the vehicle or vision data providing image of an interior of the vehicle to determine if service issues have been addressed. As a non-limiting example, the auditing module 218 may command the vehicle to drive along a predetermined path or trajectory and monitor sensor input along such a path or trajectory. In such an example, sensor input corresponding to the path or trajectory may be used to determine a quality of service performed. Thus, in this manner, the vehicle may perform self-diagnosis to audit a performance of the technician. Further, in one example, after a servicing issue has been resolved by a technician, the auditing module 218 can provide an indication to a next passenger that utilizes the vehicle that was serviced to confirm the servicing was performed, or to evaluate a performance of the servicing (e.g., by rating how clean the vehicle is, how comfortable the vehicle is, etc.).

Additional details of the computer system(s) 202 are provided below in connection with FIG. 7.

FIGS. 3-6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
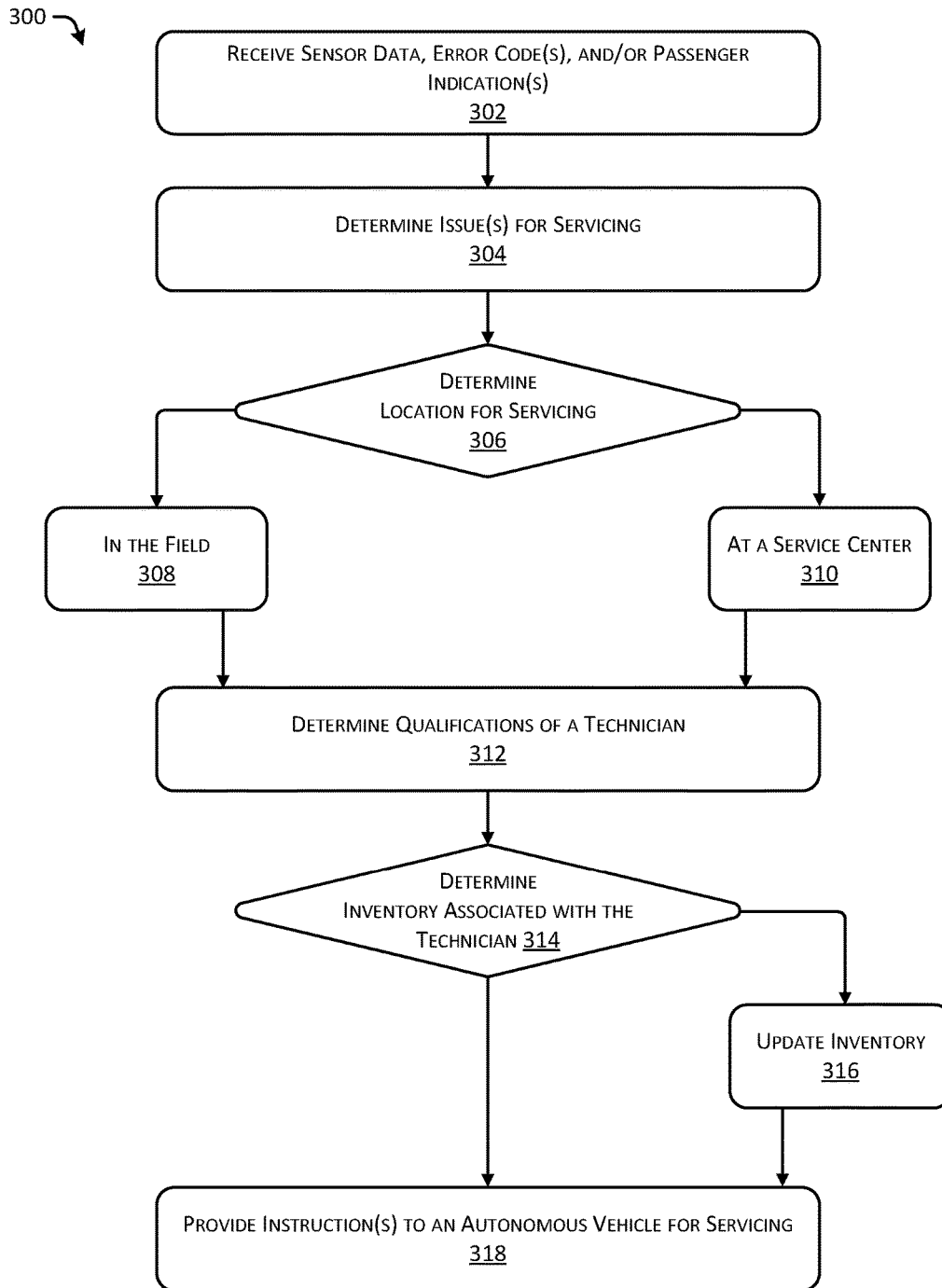
FIG. 3 depicts an example process for determining an issue for servicing and assigning a technician to perform the servicing on a vehicle.

FIG. 3 depicts an example process 300 for determining an issue for servicing and for assigning a technician to perform servicing on a vehicle. For example, some or all of the process 300 can be performed by one or more components in the architecture 200, or in the environment 700, as described herein.

At operation 302, the process can include receiving sensor data, one or more error codes, and/or one or more passenger indications. For example, the operation 302 can include receiving raw sensor data from an autonomous vehicle or can include receiving a determination from the autonomous vehicle of a service issue. In some instances, the autonomous vehicle can automatically determine a service issue and provide the indication as an error code corresponding to the service issue. Further, the operation 302 can include receiving one or more indications from a passenger (or a user), such as from a computing device operating in conjunction with an autonomous vehicle, and/or from an application operating on a computing device associated with the user (e.g., a smartphone).

At operation 304, the process can include determining one or more issues for servicing. For example, the operation 304 can include providing the received sensor data, error code(s), and/or passenger indication(s) to a service determination engine (e.g., the servicing determination module 210) to determine one or more potential service issues associated with the vehicle. In some instances, the operation 304 can include associating a probability or confidence level with individual service issues and/or ranking the individual service issues by probability or confidence level.

At operation 306, the process can include determining a location for servicing the vehicle. For example, the operation 306 can determine, based at least in part on the type of service issue(s) associated with the vehicle, where the vehicle is to be serviced. In some cases, the operation 306 can determine a location based in part on a most severe service issue associated with the vehicle. In some instances, the operation 306 can determine the location based in part on a most probable service issue (e.g., the service issue having the highest probability of being present based on the data available). In some instances, the operation 306 can be performed in conjunction with determining qualifications of a technician, discussed below.

At operation 308, the process can include a determination that the location for servicing is in the field. As used herein, a location in the field (also referred to as a "field location") corresponds to any location outside of a service center in connection with a mobile technician, for example. As discussed herein, a field location can correspond to current location of an autonomous vehicle, for example, when the autonomous vehicle is incapacitated and cannot move. A field location can correspond to a location where the autonomous vehicle is instructed to travel to where the mobile technician can perform servicing on the autonomous vehicle. Further, a field location can correspond to a home garage of a mobile technician, for example.

At operation 310, the process can include a determination that the location for servicing is at a service center. As used herein, a service center can correspond to a fixed location that provides extensive service to a plurality of autonomous vehicles, for example. In some instances, the service center can store vehicles when they are out of service. In some instances, the operator of a fleet of autonomous vehicles can be the operator of the service center.

At operation 312, the process can include determining qualifications of a technician. For example, the qualifications of the technician can be based at least in part on the issue(s) determined for servicing. For example, the operation 312 includes determining that a technician is qualified to resolve the issue(s) associated with the vehicle. In some instances, when a plurality of issues can be associated with a vehicle, the operation 312 can include determining qualifications of a technician based on a probability or likelihood of an issue being present in the vehicle. In some instances, the operation 312 can include determining qualifications based on a most severe issue, or an issue associated with the highest (most complex or advanced) qualifications. In some instances, the determined issued can be associated with a skill level of a technician suggested to resolve the issue, and the operation 312 can include determining the skill level associated with the service issue is met or exceeded by a technician.

At operation 314, the process can include determining inventory associated with the technician. In some instances, if the technician does not have an inventory associated with servicing the issue(s) associated with the vehicle, the technician can be prevented from being assigned a service task.

At operation 316, the process can include updating an inventory associated with the technician. In some instances, when a technician does not have inventory (e.g., parts, tools, materials, etc.) to perform a service task, the operation 316 can include dispatching inventory to the technician or to a location associated with the technician.

When it is determined that the inventory associated with the technician is sufficient to perform some or all of the issue(s) for servicing (e.g., in the operation 314), or when inventory is updated (e.g., in the operation 316), the process can proceed to operation 318.

At operation 318, the process can include providing instruction(s) to an autonomous vehicle for servicing. In some instances, the instructions can include, but are not limited to: an instruction to stay at a current location; an instruction to navigate to a location of a technician (e.g., a current location of the technician); an instruction to navigate to a location associated with a technician (e.g., a meeting point for the vehicle and technician); or an instruction to navigate to a home garage or service center. In some instances, the operation 318 can include determining a route or trajectory for the vehicle, and generating commands (e.g., forward acceleration, braking, steering angle, etc.) to navigate the vehicle in accordance with the commands.

Figure 4:
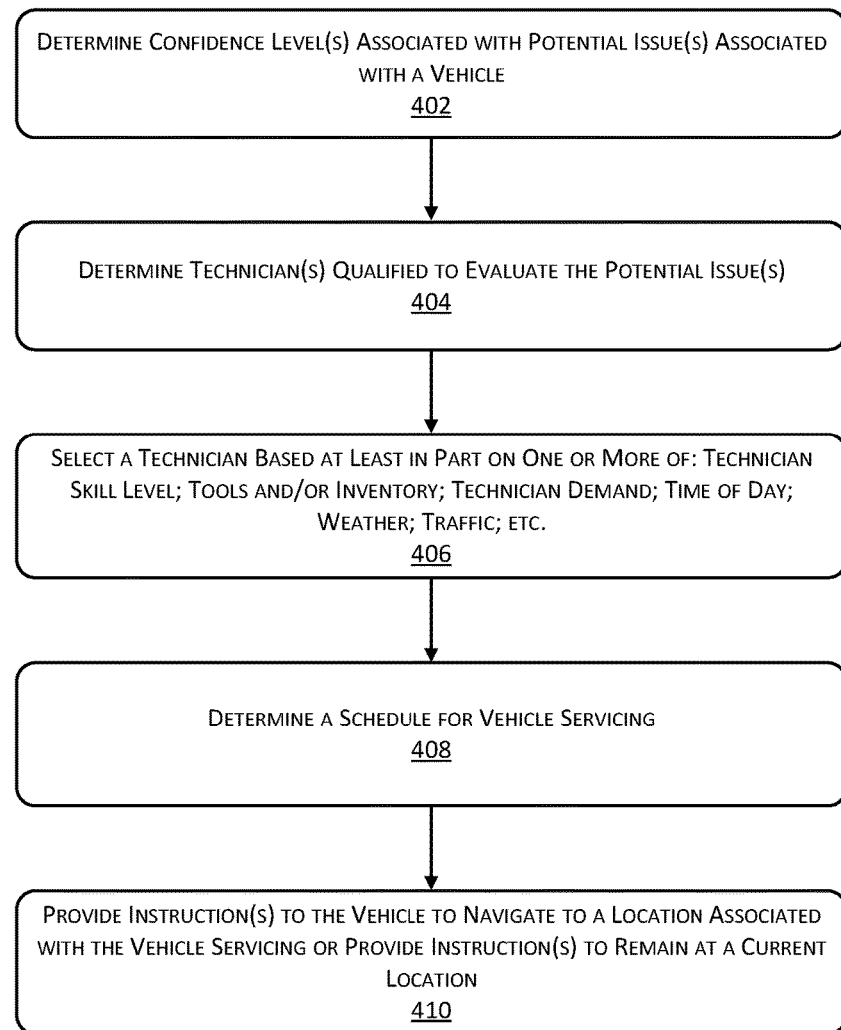
FIG. 4 depicts an example process for selecting a technician to perform servicing on a vehicle and for scheduling the servicing.

FIG. 4 depicts an example process 400 for selecting a technician to perform servicing on a vehicle and for scheduling the servicing. For example, some or all of the process 400 can be performed by one or more components in the architecture 200, or in the environment 700, as described herein.

At operation 402, the process can include determining one or more confidence levels associated with one or more potential issues associated with a vehicle. For example, the operation 402 can include receiving raw sensor data associated with the vehicle, metadata associated with sensor data from the vehicle, error code(s) from the vehicle, or any data associated with the vehicle or associated with a plurality of vehicles. Further, the operation 402 can include analyzing the data to determine likely issues with the vehicle based on the data, and a confidence level or probability associated with each potential issue. For example, if sensor data indicates that a vehicle is pulling to the left, the operation can determine that potential issues can include a flat tire, problems with wheel alignment, problems with a vehicle tracking unit, or problems with a GPS unit. Each potential issue can be associated with a confidence level or probability that the potential issue is present at the vehicle. Further, data from multiple sensors or data streams can be combined or associated to impact probabilities or confidence levels as discussed herein. In the example above, if a lateral error of a vehicle is above a threshold value, and a tire pressure indicator is below a threshold value, a probably can be increase for a potential issue representing a flat tire of a vehicle. As described above, in some examples various machine learning algorithms (such as artificial neural networks, linear or logistic regression, and the like) may be used to provide such estimates.

At operation 404, the process can include determining one or more technicians qualified to evaluate the potential issues. For example, each potential issue can be associated with a minimum skill level for a technician to have to be qualified to perform servicing on a vehicle with the potential issues. In some instances, the operation 404 can include determining whether the servicing should be performed in the field or at a service center.

At operation 406, the process can include selecting a technician based at least in part on one or more of: technician skill level; tools and/or inventory; technician demand; time of day; weather; traffic; etc. In general, the operation 406 can include selecting a technician to minimize downtime of the vehicle. In this light, the operation 406 can include selecting a technician that is qualified to perform servicing on a vehicle to fix a potential issue associated with the highest probability or confidence level in the shortest amount of time. Further, the operation 406 can include selecting a technician to maximize an overall number of vehicles of a fleet available for use during a particular period of time. In some instances, the operation 406 can use any optimization algorithms, machine learning, or combination thereof to select a technician to resolve a potential service issue associated with the vehicle.

At operation 408, the process can include determining a schedule for vehicle servicing. In some instances, the operation 408 can include determining an operational status of the vehicle and whether the vehicle is to be serviced in the near future (e.g., immediately, within hours, etc.) or whether the vehicle servicing can be delayed until a later time (or until a demand for vehicles drops below a threshold). In general, the operation 408 can include optimizing scheduling for a plurality of vehicles to optimize a number of vehicles available for use in light of current demand or anticipated demand, state of the vehicles, severity of issues, availability of technicians, etc. In one implementation, if a demand for servicing issues is above a capacity that can be handled by a number of available technicians, the operation 408 can include providing an indication to one or more off-duty technicians to start a shift early or to assign service tasks outside available working periods associated with various technicians.

At operation 410, the process can include providing one or more instructions to the vehicle to navigate to a location associated with the vehicle servicing or provide one or more instructions to remain at a current location. In some implementations, the operation 410 can be similar to the instructions described in connection with the process 300, above. Further, the operation 410 can include providing instructions to the vehicle to stay in the field until a later time in accordance with the schedule determined in the operation 408.

Figure 5:
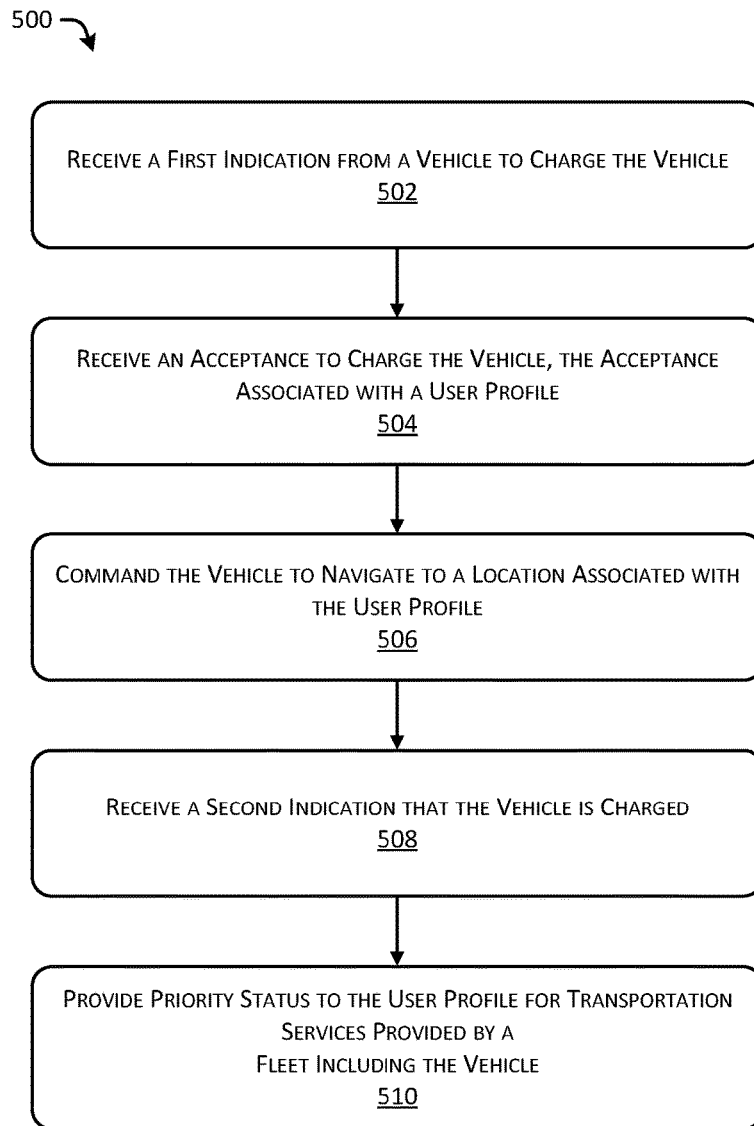
FIG. 5 depicts an example process for distributed charging of a vehicle and providing a priority status to a user profile.

FIG. 5 depicts an example process 500 for distributed charging of a vehicle and providing a priority status to a user profile. For example, some or all of the process 500 can be performed by one or more components in the architecture 200, or in the environment 700, as described herein.

At operation 502, the process can include receiving a first indication from a vehicle to charge the vehicle. For example, the vehicle can be an autonomous vehicle utilizing electricity as a propulsion energy source. The vehicle can determine that the vehicle is outside of a range to return to a predetermined location (e.g., a charging facility, a service center, etc.) or can determine that a demand for the vehicle (or a demand for the fleet of vehicles) is below a threshold demand level. The vehicle can transmit the first indication to be received by a central server, and can request that charging operations be provided to the vehicle. In some instances, the first indication can include a request for services in addition to or instead of a request for charging. For example, the request may include a service request for the vehicle to be cleaned. In some instances, the operation 502 can include transmitting a request based on the first indication to one or more users to charge the vehicle. In some instances, the request can be transmitted to user(s) within a threshold distance from the vehicle, where the distance can be based on a remaining charge level associated with the vehicle.

At operation 504, the process can include receiving an acceptance to charge the vehicle, wherein the acceptance is associated with a user profile. Further, the user profile can be associated with a location that is configured to charge the vehicle. In some instances, the operation 504 can include determining that the user profile is authorized to charge the vehicle; in some instances, user profiles can be required to be authorized to receive a request to charge the vehicle, as discussed herein.

At operation 506, the process can include commanding the vehicle to navigate to a location associated with the user profile. In a case where the vehicle is an autonomous vehicle, the operation 506 can include providing commands or instructions to guide the vehicle to the location, as discussed herein.

At operation 508, the process can include receiving a second indication that the vehicle is charged. In some instances, the operation 508 can include receiving an indication of an amount of power used to charge the vehicle to reimburse an account associated with the user profile for a cost associated with the charging. In some instances, any reimbursement may be based on an amount of power received by the vehicle (e.g., as a percentage of a battery charge level increased). In some instances, reimbursement may be provided as credits for travel using a fleet of vehicles associated with the vehicle.

At operation 510, the process can include providing a priority status to the user profile for transportation services provided by a fleet including the vehicle. For example, in an implementation where the vehicle is part of a fleet of vehicles providing transportation services (e.g., as a fleet of autonomous taxis), when a request associated with the user profile is received, the user profile may receive a priority status to decrease waiting time to be picked up, for example. In some instances, a user may receive a reduce rate for transportation services, priority vehicles (e.g., newer models), etc., in addition to or instead of the priority status.

Figure 6:
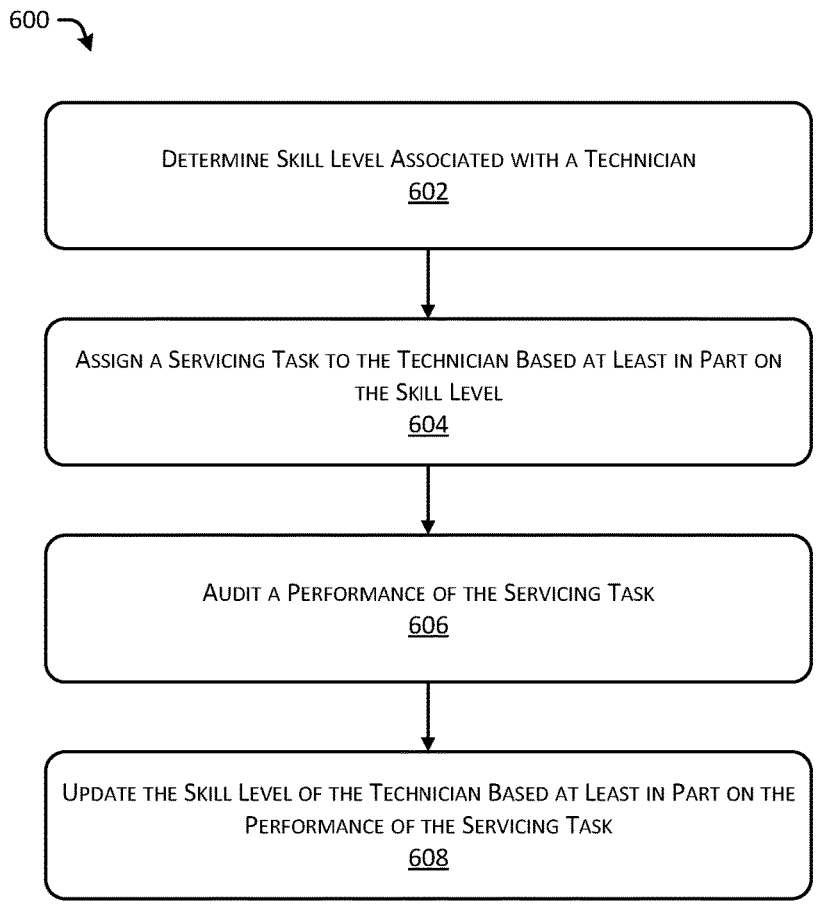
FIG. 6 depicts an example process for upgrading a skill level of a technician based on a performance of the technician.

FIG. 6 depicts an example process 600 for upgrading a skill level of a technician based on a performance of the technician. For example, some or all of the process 600 can be performed by one or more components in the architecture 200, or in the environment 700, as described herein.

At operation 602, the process can include determining a skill level associated with a technician. In some instances, a skill level can be based at least in part on a type of servicing to be performed (e.g., to distinguish between cleaning of a vehicle and repair, etc.). In some instances, the skill level can be based in part on previous work experience, certifications, audits of maintenance or repairs, number of servicing tasks completed, etc.

At operation 604, the process can include assigning a servicing task to the technician based at least in part on the skill level. For example, in one implementation where servicing tasks are rated in complexity from one to ten, with ten being the most complex task, a skill level of a technician can be associated with the complexity of tasks available to be performed by the technician. Continuing with this example, if a servicing task has a complexity level of five, and a technician has a skill level of two, the servicing task may not be assigned to the technician. If the technician has a skill level of at least five, the servicing task may be assigned to the technician.

At operation 606, the process can include auditing a performance of the servicing task. For example, upon completion of the servicing task by the technician, the operation may include 606 providing an instruction to another technician to audit or evaluate a performance of the technician under review. In some instances, the operation 606 may include monitoring data associated with the vehicle that was serviced to determine that the issue was resolved. In some instances, auditing may be performed at any regular or irregular interval, randomly, etc. In some instances, if a servicing issue was address by a technician, the operation 606 can include determining if the same or similar issue arises within a predetermine period of time. In some instance, the operation 606 can include determining that an error code associated with the servicing task was cleared. In some instances, auditing may be performed by a perception system of an autonomous vehicle, or by a self-diagnostics algorithm implemented by the vehicle, for example. In some instances, a rate of auditing may increase or decrease over time based on performance of the technician.

At operation 608, the process can include updating the skill level of the technician based at least in part on the performance of the servicing task. For example, as a number of completed servicing task increases above a threshold number of tasks, the technician may "level up" and be assigned a higher skill level corresponding to more difficult tasks. Conversely, if a performance of the technician is poor or below a quality threshold, a skill level of the technician may be reduced. In some instances, the operation 608 may include providing one or more learning modules, instructional videos, additional training, etc., for the technician to complete before updating a skill level of the technician. In some instances, the operation 608 can include providing messages or indications to the technician of the quality of the performance of the servicing task (e.g., "good job!").

Figure 7:
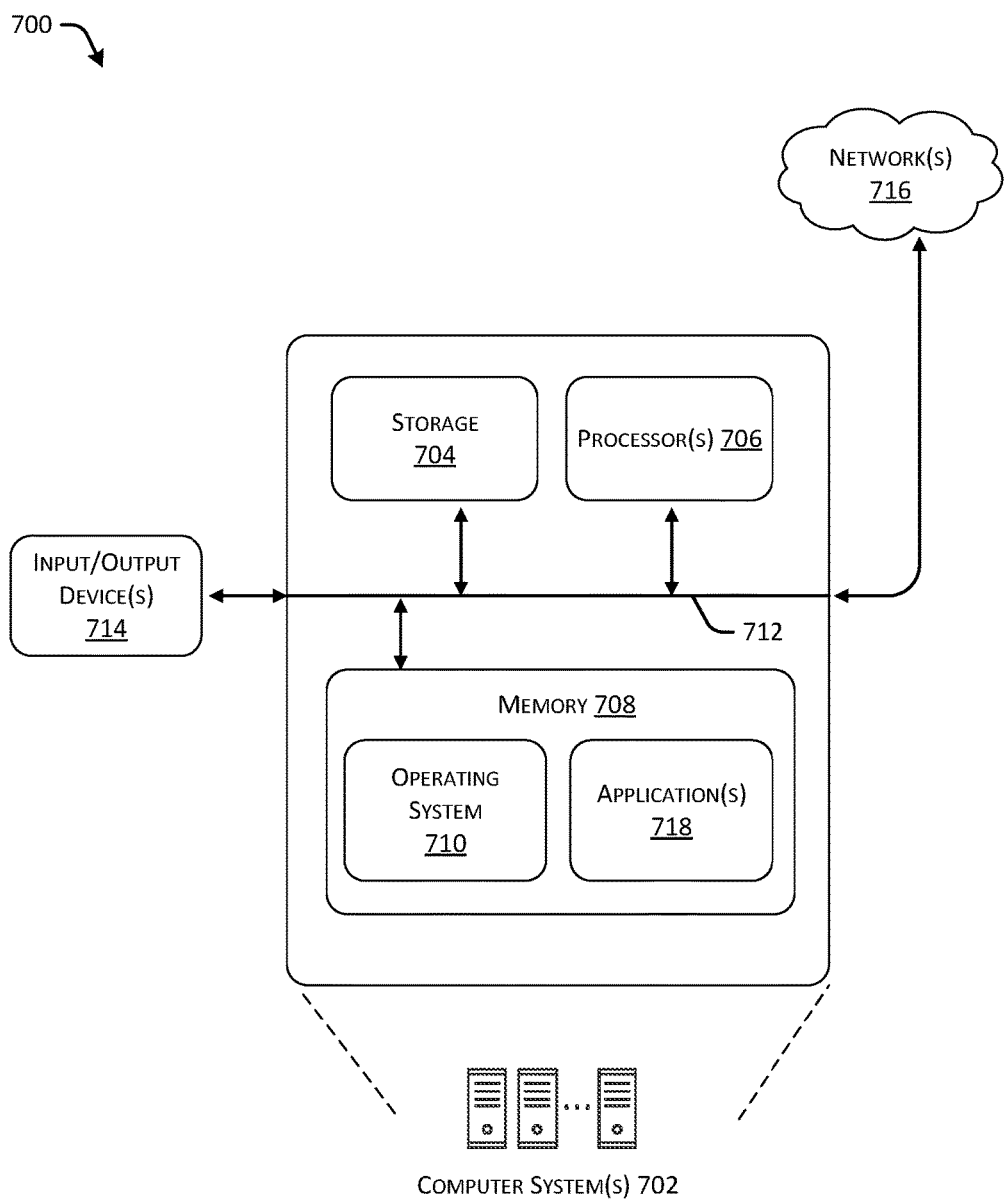
FIG. 7 depicts a block diagram of an example computer system for implementing the techniques described herein.

FIG. 7 illustrates an environment 700 in which the disclosures can be implemented in whole or in part. The environment 700 depicts one or more computer systems 702 that comprise a storage 704, one or more processor(s) 706, a memory 708, and an operating system 710. The storage 704, the processor(s) 706, the memory 708, and the operating system 710 can be communicatively coupled over a communication infrastructure 712. Optionally, the computer system 702 can interact with a user, or environment, via input/output (I/O) device(s) 714, as well as one or more other computing devices over a network 716, via the communication infrastructure 712. The operating system 710 can interact with other components to control one or more applications 718.

In some instances, the computer system(s) 702 can correspond to the computer system(s) 202 of FIG. 2. Further, the computer system(s) 202 can implement any hardware and/or software to implement the modules 204, 206, 208, 210, 212, 214, 216, and 218, and to perform automated vehicle diagnostics and maintenance, as discussed herein.

The systems and methods described herein can be implemented in software or hardware or any combination thereof. The systems and methods described herein can be implemented using one or more computing devices which can or can not be physically or logically separate from each other. The methods can be performed by components arranged as either on-premise hardware, on-premise virtual systems, or hosted-private instances. Additionally, various aspects of the methods described herein can be combined or merged into other functions.

An exemplary environment and computerized system for implementing the systems and methods described herein is illustrated in FIG. 7. A processor or computer system can be configured to particularly perform some or all of the methods described herein. In some embodiments, the methods can be partially or fully automated by one or more computers or processors. The systems and methods described herein can be implemented using a combination of any of hardware, firmware, and/or software. The present systems and methods described herein (or any part(s) or function(s) thereof) can be implemented using hardware, software, firmware, or a combination thereof and can be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein can be directed toward one or more computer systems capable of carrying out the functionality described herein. Example computing devices can be, but are not limited to, a personal computer (PC) system running any operating system such as, but not limited to, OS X™, iOS™, Linux™, Android™, and Microsoft™ Windows™ However, the systems and methods described herein can not be limited to these platforms. Instead, the systems and methods described herein can be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., can also be implemented using a computing device. Services can be provided on demand using, e.g., but not limited to, an interactive television (iTV), a video on demand system (VOD), and via a digital video recorder (DVR), or other on demand viewing system.

The system can include one or more processors. The processor(s) can be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices can include a display interface that can forward graphics, text, and other data from the communication infrastructure for display on a display unit.

The computer system can also include, but is not limited to, a main memory, random access memory (RAM), and a secondary memory, etc. The secondary memory can include, for example, a hard disk drive and/or a removable storage drive, such as a compact disc drive CD-ROM, etc. The removable storage drive can read from and/or written to a removable storage unit. As can be appreciated, the removable storage unit can include a computer usable storage medium having stored therein computer software and/or data. In some embodiments, a machine-accessible medium can refer to any storage device used for storing data accessible by a computer. Examples of a machine-accessible medium can include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor can also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store can be a database server, such as Microsoft SQL Server™, Oracle™, IBM DB2™, SQLITE™, or any other database software, relational or otherwise. The data store can store the information identifying syntactical tags and any information required to operate on syntactical tags. In some embodiments, the processing system can use object-oriented programming and can store data in objects. In these embodiments, the processing system can use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc., can be stored in tables in the RDBMS. The tables can have pre-defined relationships between them. The tables can also have adjuncts associated with the coordinates.

In alternative exemplary embodiments, secondary memory can include other similar devices for allowing computer programs or other instructions to be loaded into a computer system. Such devices can include, for example, a removable storage unit and an interface. Examples of such can include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which can allow software and data to be transferred from the removable storage unit to computer system.

The computing device can also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device can also include output devices, such as but not limited to, a display, and a display interface. The computing device can include input/output (I/O) devices such as but not limited to a communications interface, cable and communications path, etc. These devices can include, but are not limited to, a network interface card, and modems. Communications interface(s) can allow software and data to be transferred between a computer system and one or more external devices.

In one or more embodiments, the computing device can be operatively coupled to an automotive system. Such automotive system can be either manually operated, semi-autonomous, or fully autonomous. In such an embodiment, input and output devices can include one or more image capture devices, controllers, microcontrollers, and/or other processors to control automotive functions such as, but not limited to, acceleration, braking, and steering. Further, communication infrastructure in such embodiments can also include a Controller Area Network (CAN) bus.

In one or more embodiments, the computing device can be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and can be applicable to any application utilizing machine vision.

In one or more embodiments, the present embodiments can be practiced in the environment of a computer network or networks. The network can include a private network, or a public network (for example the Internet, as described below), or a combination of both. The network can include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments can include nodes, which can include hardware, software, or a combination of hardware and software. The nodes can be interconnected via a communications network. Each node can include one or more processes, executable by processors incorporated into the nodes. A single process can be run by multiple processors, or multiple processes can be run by a single processor, for example. Additionally, each of the nodes can provide an interface point between network and the outside world, and can incorporate a collection of sub-networks.

In an exemplary embodiment, the processes can communicate with one another through interprocess communication pathways supporting communication through any communications protocol. The pathways can function in sequence or in parallel, continuously or intermittently. The pathways can use any of the communications standards, protocols or technologies, described herein with respect to a communications network, in addition to standard parallel instruction sets used by many computers.

The nodes can include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes can be made possible by a communications network. A node can be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network can include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure can include apparatuses for performing the operations herein. An apparatus can be specially constructed for the desired purposes, or it can comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals can be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters can also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, PYTHON, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP can be used in implementing interfaces between programming modules. The components and functionality described herein can be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as RUBY ON RAILS.

Suitable processors for the execution of a program of instructions include, but are not limited to, general and special purpose microprocessors, and the sole processor or one of multiple processors or cores, of any kind of computer. A processor can receive and store instructions and data from a computerized data storage device such as a read-only memory, a random access memory, both, or any combination of the data storage devices described herein. A processor can include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure can be practiced with other computer system configurations, including hand-held devices, microprocessor systems, microprocessor-based or programmable consumer electronics, minicomputers, mainframe computers, etc. The systems and methods described herein can also be practiced in distributed computing environments where tasks are performed by remote processing devices that are linked through a network.

The terms "computer program medium" and "computer readable medium" can be used to generally refer to media such as but not limited to removable storage drive, a hard disk installed in hard disk drive. These computer program products can provide software to computer system. The systems and methods described herein can be directed to such computer program products.

References to "one embodiment," "an embodiment," "example embodiment," "various embodiments," etc., can indicate that the embodiment(s) of the present disclosure can include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they can. Similarly, references to "instances" can indicate that various instance(s) of the present disclosure can include a particular feature, structure, or characteristic, but not every instance necessarily includes the particular feature, structure, or characteristic. Further, repeated use of the phrase "in some instances" does not necessarily refer to the same instance, although it can.

In the description and claims, the terms "coupled" and "connected," along with their derivatives, can be used. It should be understood that these terms can be not intended as synonyms for each other. Rather, in particular embodiments, "connected" can be used to indicate that two or more elements are in direct physical or electrical contact with each other. "Coupled" can mean that two or more elements are in direct physical or electrical contact. However, "coupled" can also mean that two or more elements are not in direct contact with each other, but yet still co-operate or interact with each other.

An algorithm can be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it can be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" can refer to any device or portion of a device that processes electronic data from registers and/or memory to transform that electronic data into other electronic data that can be stored in registers and/or memory. As non-limiting examples, "processor" can be a Central Processing Unit (CPU) or a Graphics Processing Unit (GPU). A "computing platform" can comprise one or more processors. As used herein, "software" processes can include, for example, software and/or hardware entities that perform work over time, such as tasks, threads, and intelligent agents. Also, each process can refer to multiple processes, for carrying out instructions in sequence or in parallel, continuously or intermittently. The terms "system" and "method" are used herein interchangeably insofar as the system can embody one or more methods and the methods can be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments can be used and that changes or alterations, such as structural changes, can be made. Such embodiments, changes or alterations are not necessarily departures from the scope with respect to the intended claimed subject matter. While the steps herein can be presented in a certain order, in some implementations the ordering can be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A system comprising: one or more processors; and one or more computer readable storage media communicatively coupled to the one or more processors and storing instructions that are executable by the one or more processors to: receive at least one of sensor data or one or more error codes associated with an autonomous vehicle; determine at least one servicing issue associated with the autonomous vehicle based at least in part on the at least one of the sensor data or the one or more error codes, the at least one servicing issue associated with a cleanliness of the autonomous vehicle, a potential hardware malfunction associated with the autonomous vehicle, or a state of the autonomous vehicle; determine that the autonomous vehicle is to be serviced by a mobile technician based at least in part on the at least one servicing issue associated with the autonomous vehicle; determine a technician skill level associated with the at least one servicing issue, the technician skill level indicating a qualification of technicians to resolve the at least one servicing issue; select a technician from one or more technicians to service the at least one servicing issue associated with the autonomous vehicle, wherein the technician is selected based at least in part on i) the technician skill level, ii) a distance between a first location of the autonomous vehicle and a second location of the technician, and iii) a traffic level associated with the first location or the second location; and provide instructions to the autonomous vehicle to navigate to the second location of the technician.

B. The system as paragraph A recites, wherein the instructions are further executable by the one or more processors to: receive a first indication that the technician has resolved the at least one servicing issue; transmit a second indication to audit a performance of the technician associated with the service; receive a third indication associated with the performance of the technician; and update the technician skill level associated with the technician based at least in part on the performance of the technician.

C. The system as paragraph B recites, wherein the second indication includes one or more instructions to the autonomous vehicle to perform self-diagnostics to audit the performance of the technician.

D. The system as any of paragraphs A-C recite, wherein the sensor data is associated with at least one of a longitudinal behavior of the autonomous vehicle or a lateral behavior of the autonomous vehicle.

E. The system as any of paragraphs A-D recite, wherein the sensor data is associated with a vision system monitoring an interior or exterior of the autonomous vehicle.

F. The system as any of paragraphs A-E recite, wherein the technician is a first technician, and wherein the instructions are further executable by the one or more processors to: receive an indication associated with the cleanliness of the autonomous vehicle, the indication received from a computing device associated with a user; and dispatch a second technician to the autonomous vehicle to clean the autonomous vehicle.

G. The system as any of paragraphs A-F recite, wherein the autonomous vehicle is one of a fleet of autonomous vehicles, the fleet of autonomous vehicles collectively providing transportation services for hire, and further wherein the instructions are further executable by the one or more processors to schedule a time for the service of the at least one servicing issue associated with the autonomous vehicle, the time based at least in part on a demand associated with the fleet of autonomous vehicles or an availability of the one or more technicians at the time.

H. The system as any of paragraphs A-G recite, wherein the autonomous vehicle is one of a fleet of autonomous vehicles, the fleet of autonomous vehicles collectively providing transportation services for hire, and further wherein the instructions are further executable by the one or more processors to: aggregate fleet sensor data received from at least a portion of the fleet of autonomous vehicles; and determine the at least one servicing issue associated with the autonomous vehicle based at least in part on the fleet sensor data.

I. The system as any of paragraphs A-H recite, wherein determining the at least one servicing issue includes utilizing at least one machine learning algorithm to identify the at least one servicing issue.

J. A method comprising: receiving data associated with a state of a vehicle; determining at least one potential servicing issue associated with the vehicle based at least in part on the data; determining a technician skill level associated with the at least one potential servicing issue, the technician skill level indicating a qualification of technicians to resolve the at least one potential servicing issue; selecting a technician from one or more technicians to service the at least one potential servicing issue associated with the vehicle; determining a service location to service the vehicle based at least in part on one or more of the at least one potential servicing issue associated with the vehicle or the technician selected; and providing instructions to the vehicle or to the technician to navigate to the service location to service the vehicle.

K. The method as paragraph J recites, wherein the receiving the data associated with the state of the vehicle comprises receiving sensor data indicating a longitudinal behavior of the vehicle or indicating a latitudinal behavior of the vehicle.

L. The method as paragraph J or K recite, wherein the service location is selected from at least one of a mobile location associated with a mobile technician, a current location of the vehicle, or a service center associated with a fixed location.

M. The method as any of paragraphs J-L recite, further comprising selecting the technician based at least in part on at least one of: the technician skill level associated with the at least one potential servicing issue; an inventory associated with the technician; a first location associated with the technician relative to a second location associated with the vehicle; or a traffic level associated with the first location or the second location.

N. The method as any of paragraphs J-M recite, wherein the service location is a first location, further comprising: receiving a first indication of a battery charge level associated with the vehicle; receiving a second indication to charge a battery associated with the vehicle at a second location associated with a user profile;

instructing the vehicle to navigate to the second location; receiving a third indication that the battery has been charged; and associating a priority status with the user profile to provide transportation services associated with the vehicle.

O. The method as any of paragraphs J-N recite, further comprising: associating the technician with a user profile; and associating a priority status with the user profile to provide transportation services associated with the vehicle.

P. A system comprising: one or more processors; and one or more computer readable storage media communicatively coupled to the one or more processors and storing instructions that are executable by the one or more processors to: receive data associated with a state of a vehicle; determine at least one potential servicing issue associated with the vehicle based at least in part on the data; determine a technician skill level associated with the at least one potential servicing issue, the technician skill level indicating a qualification of technicians to resolve the at least one potential servicing issue; select a technician of one or more technicians to service the at least one potential servicing issue associated with the vehicle; determine a service location to service the vehicle based at least in part on one or more of the at least one potential servicing issue associated with the vehicle or the technician; and provide instructions to the vehicle or to the technician to navigate to the location to service the vehicle.

Q. The system as paragraph P recites, wherein the receiving the data associated with the state of the vehicle comprises at least one of: receiving first sensor data indicating a longitudinal behavior of the vehicle; receiving second sensor data indicating a latitudinal behavior of the vehicle; or receiving an indication of the state of the vehicle from a computing device operable by a user.

R. The system as paragraphs P or Q recite, wherein the instructions are further executable by the one or more processors to: determine an inventory associated with the technician; and select the technician to service the at least one potential servicing issue associated with the vehicle based at least in part on the inventory.

S. The system as any of paragraphs P-R recite, wherein the instructions are further executable by the one or more processors to: determine an inventory associated with the technician; determine that the inventory does not include at least one part or at least one tool associated with the at least one potential servicing issue; and dispatch an autonomous vehicle to the technician, the autonomous vehicle including the at least one part or the at least one tool not included in the inventory associated with the technician.

T. The system as any of paragraphs P-S recite, wherein the instructions are further executable by the one or more processors to: receive path segment information associated with movement of a plurality of vehicles through a path segment; determine a nominal performance of at least a portion of the plurality of vehicles associated with the path segment; and determine the at least one potential servicing issue based at least in part on the data associated with the state of the vehicle and the nominal performance associated with the path segment.

What is claimed is:

1. A system comprising:
one or more processors; and
one or more non-transitory computer readable storage media communicatively coupled to the one or more processors and storing instructions that are executable by the one or more processors to:
receive at least one of sensor data or one or more error codes associated with an autonomous vehicle;
determine at least one servicing issue associated with the autonomous vehicle based at least in part on the at least one of the sensor data or the one or more error codes, the at least one servicing issue associated with a cleanliness of the autonomous vehicle, a potential hardware malfunction associated with the autonomous vehicle, or a state of the autonomous vehicle;
determine that the autonomous vehicle is to be serviced by a mobile technician based at least in part on the at least one servicing issue associated with the autonomous vehicle;
determine a technician skill level associated with the at least one servicing issue, the technician skill level indicating a qualification of technicians to resolve the at least one servicing issue;
select a technician from one or more technicians to service the at least one servicing issue associated with the autonomous vehicle, wherein the technician is selected based at least in part on i) the technician skill level, ii) a distance between a first location of the autonomous vehicle and a second location of the technician, and iii) a traffic level associated with the first location or the second location; and
provide instructions to the autonomous vehicle to navigate to the second location of the technician.

2. The system of claim 1, wherein the instructions are further executable by the one or more processors to:
receive a first indication that the technician has resolved the at least one servicing issue;
transmit a second indication to audit a performance of the technician associated with the service;
receive a third indication associated with the performance of the technician; and
update the technician skill level associated with the technician based at least in part on the performance of the technician.

3. The system of claim 2, wherein the second indication includes one or more instructions to the autonomous vehicle to perform self-diagnostics to audit the performance of the technician.

4. The system of claim 1, wherein the sensor data is associated with at least one of a longitudinal behavior of the autonomous vehicle or a lateral behavior of the autonomous vehicle.

5. The system of claim 1, wherein the sensor data is associated with a vision system monitoring an interior or exterior of the autonomous vehicle.

6. The system of claim 1, wherein the technician is a first technician, and wherein the instructions are further executable by the one or more processors to:
receive an indication associated with the cleanliness of the autonomous vehicle, the indication received from a computing device associated with a user; and
dispatch a second technician to the autonomous vehicle to clean the autonomous vehicle.

7. The system of claim 1,
wherein the autonomous vehicle is one of a fleet of autonomous vehicles, the fleet of autonomous vehicles collectively providing transportation services for hire, and
further wherein the instructions are further executable by the one or more processors to schedule a time for the service of the at least one servicing issue associated with the autonomous vehicle, the time based at least in part on a demand associated with the fleet of autonomous vehicles or an availability of the one or more technicians at the time.

8. The system of claim 1,
wherein the autonomous vehicle is one of a fleet of autonomous vehicles, the fleet of autonomous vehicles collectively providing transportation services for hire, and
further wherein the instructions are further executable by the one or more processors to:
aggregate fleet sensor data received from at least a portion of the fleet of autonomous vehicles; and
determine the at least one servicing issue associated with the autonomous vehicle based at least in part on the fleet sensor data.

9. The system of claim 1, wherein determining the at least one servicing issue includes utilizing at least one machine learning algorithm to identify the at least one servicing issue.

10. A method comprising:
receiving data associated with a state of a vehicle;
determining at least one potential servicing issue associated with the vehicle based at least in part on the data;

determining a technician skill level associated with the at least one potential servicing issue, the technician skill level indicating a qualification of technicians to resolve the at least one potential servicing issue;

selecting a technician from one or more technicians to service the at least one potential servicing issue associated with the vehicle, wherein selecting the technician is based at least in part on at least one of:
- the technician skill level associated with the at least one potential servicing issue;
- an inventory associated with the technician;
- a first location associated with the technician relative to a second location associated with the vehicle; or
- a traffic level associated with the first location or the second location;

determining a service location to service the vehicle based at least in part on one or more of the at least one potential servicing issue associated with the vehicle or the technician selected; and providing instructions to the vehicle or to the technician to navigate to the service location to service the vehicle.

11. The method of claim 10, wherein the receiving the data associated with the state of the vehicle comprises receiving sensor data indicating a longitudinal behavior of the vehicle or indicating a latitudinal behavior of the vehicle.

12. The method of claim 10, wherein the service location is selected from at least one of a mobile location associated with a mobile technician, a current location of the vehicle, or a service center associated with a fixed location.

13. The method of claim 10, further comprising:
receiving a first indication of a battery charge level associated with the vehicle;
receiving a second indication to charge a battery associated with the vehicle at a third location associated with a user profile;
instructing the vehicle to navigate to the third location;
receiving a third indication that the battery has been charged; and
associating a priority status with the user profile to provide transportation services associated with the vehicle.

14. The method of claim 10, further comprising:
associating the technician with a user profile; and
associating a priority status with the user profile to provide transportation services associated with the vehicle.

15. The method of claim 14, wherein the priority status is associated with a decreased wait time when requesting the transportation services from a fleet of autonomous vehicles.

16. A system comprising:
one or more processors; and
one or more non-transitory computer readable storage media communicatively coupled to the one or more processors and storing instructions that are executable by the one or more processors to:
receive data associated with a state of a vehicle;
determine at least one potential servicing issue associated with the vehicle based at least in part on the data;
determine a technician skill level associated with the at least one potential servicing issue, the technician skill level indicating a qualification of technicians to resolve the at least one potential servicing issue;
select a technician of one or more technicians to service the at least one potential servicing issue associated with the vehicle based at least in part on determining an inventory associated with the technician;
determine a service location to service the vehicle based at least in part on one or more of the at least one potential servicing issue associated with the vehicle or the technician; and
provide instructions to the vehicle or to the technician to navigate to the service location to service the vehicle.

17. The system of claim 16, wherein the receiving the data associated with the state of the vehicle comprises at least one of:
receiving first sensor data indicating a longitudinal behavior of the vehicle;
receiving second sensor data indicating a latitudinal behavior of the vehicle; or
receiving an indication of the state of the vehicle from a computing device operable by a user.

18. The system of claim 16, wherein the instructions are further executable by the one or more processors to:
determine that the inventory does not include at least one part or at least one tool associated with the at least one potential servicing issue; and
dispatch an autonomous vehicle to the technician, the autonomous vehicle including the at least one part or the at least one tool not included in the inventory associated with the technician.

19. The system of claim 16, wherein the instructions are further executable by the one or more processors to:
receive path segment information associated with movement of a plurality of vehicles through a path segment;
determine a nominal performance of at least a portion of the plurality of vehicles associated with the path segment; and
determine the at least one potential servicing issue based at least in part on the data associated with the state of the vehicle and the nominal performance associated with the path segment.

20. The system of claim 16, wherein the instructions are further executable by the one or more processors to:
increase, as an updated technician skill level, the technician skill level based at least in part on resolving the at least one potential servicing issue.

* * * * *